(12) United States Patent
Bao (10) Patent No.: US 12,421,716 B2
(45) Date of Patent: Sep. 23, 2025

(54) HEAT INSULATION WALL AND MANUFACTURING METHOD AND MOUNTING METHOD THEREOF

(71) Applicant: CHENGJI PASSIVE HOUSE (HANGZHOU) CO. LTD., Zhejiang (CN)

(72) Inventor: Chengji Bao, Zhejiang (CN)

(73) Assignee: Chengji Bao, Fujian (CN)

( * ) Notice: Subject to any disclaimer, the term of this patent is extended or adjusted under 35 U.S.C. 154(b) by 0 days.

(21) Appl. No.: 17/638,766

(22) PCT Filed: Dec. 23, 2021

(86) PCT No.: PCT/CN2021/140927
§ 371 (c)(1),
(2) Date: Feb. 25, 2022

(87) PCT Pub. No.: WO2023/070923
PCT Pub. Date: May 4, 2023

(65) Prior Publication Data
US 2024/0384529 A1   Nov. 21, 2024

(30) Foreign Application Priority Data
Nov. 1, 2021   (CN) .......................... 202111281479.7

(51) Int. Cl.
*E04B 2/02*   (2006.01)
*B23K 26/21*   (2014.01)
(Continued)

(52) U.S. Cl.
CPC ................ *E04B 2/02* (2013.01); *B23K 26/21* (2015.10); *E04B 2/7411* (2013.01); *E04B 2/84* (2013.01);
(Continued)

(58) Field of Classification Search
CPC .......... E04B 2/02; E04B 1/625; E04B 1/7629; E04C 2/2885; E04C 2/284; E04C 2/38
(Continued)

(56) References Cited

U.S. PATENT DOCUMENTS 4,530,877 A * 7/1985 Hadley ................... E04B 1/942
428/920
4,774,794 A * 10/1988 Grieb ...................... E04B 7/225
52/309.7

(Continued)

FOREIGN PATENT DOCUMENTS

CN   201011037 Y   1/2008
CN   104594522 A   5/2015
(Continued)

*Primary Examiner* — Paola Agudelo
(74) *Attorney, Agent, or Firm* — Seed IP Law Group LLP (57) ABSTRACT

The disclosure provides a heat insulation wall, and a manufacturing method and a mounting method thereof. The heat insulation wall includes at least one layer of panel, at least one layer of bottom plate and at least one layer of heat insulation board, wherein the panel and the bottom plate are connected through at least one partition body, and the heat insulation board is arranged between the panel and the bottom plate and is maintained by the partition body; the partition body includes a partition body head connected with the panel and a partition body tail connected with the partition body head and the bottom in a partition manner.

18 Claims, 2 Drawing Sheets

(51) Int. Cl.
*E04B 2/74* (2006.01)
*E04B 2/84* (2006.01)

(52) U.S. Cl.
CPC ... *E04B 2002/7477* (2013.01); *E04B 2103/02* (2013.01); *E04B 2103/06* (2013.01)

(58) Field of Classification Search
USPC ........................................................ 52/309.8
See application file for complete search history.

(56) References Cited

U.S. PATENT DOCUMENTS

| | | | | |
|---|---|---|---|---|
| 5,086,599 | A * | 2/1992 | Meyerson | E04C 2/292 52/592.6 |
| 5,440,846 | A * | 8/1995 | Record | C04B 28/02 52/412 |
| 6,122,879 | A * | 9/2000 | Montes | E04F 13/0876 52/592.4 |
| 6,945,506 | B2 * | 9/2005 | Long, Sr. | E04C 5/07 249/40 |
| 8,877,329 | B2 * | 11/2014 | Ciuperca | B32B 13/12 52/424 |
| 10,011,988 | B2 * | 7/2018 | Foderberg | E04C 2/46 |
| 10,961,699 | B2 * | 3/2021 | Campacci | B32B 19/06 |
| 2009/0235599 | A1 * | 9/2009 | Ware | B32B 13/04 52/794.1 |
| 2009/0313931 | A1 * | 12/2009 | Porter | B32B 21/02 52/309.3 |
| 2013/0125489 | A1 * | 5/2013 | Zhou | E04B 1/762 52/309.3 |
| 2014/0059961 | A1 | 3/2014 | Yin et al. | |
| 2014/0345223 | A1 * | 11/2014 | Miks | E04B 2/562 52/309.4 |
| 2015/0069647 | A1 * | 3/2015 | Ciuperca | C04B 7/02 249/13 |
| 2016/0069067 | A1 * | 3/2016 | Ciuperca | E04B 1/7633 52/309.8 |
| 2022/0090380 | A1 * | 3/2022 | Dombowsky | B28B 19/003 |

FOREIGN PATENT DOCUMENTS

| | | |
|---|---|---|
| CN | 205063170 U | 3/2016 |
| CN | 105604278 A | 5/2016 |
| CN | 108951889 A | 12/2018 |
| CN | 110700482 A | 1/2020 |
| CN | 213390625 U | 6/2021 |
| CN | 214239814 U | 9/2021 |
| EP | 2093344 A1 | 8/2009 |
| JP | h0571332 U | 9/1993 |
| JP | h061082 B2 | 1/1994 |
| JP | h1088686 A | 4/1998 |
| JP | 2010156189 A | 7/2010 |
| JP | 5667038 B2 | 2/2015 |
| JP | 6178911 B2 | 8/2017 |
| KR | 200161693 Y1 | 12/1999 |
| KR | 20190049102 A | 5/2019 |
| WO | 2018220559 A1 | 12/2018 |

* cited by examiner

HEAT INSULATION WALL AND MANUFACTURING METHOD AND MOUNTING METHOD THEREOF

CROSS-REFERENCE TO RELATED APPLICATIONS

The present application claims the priority of the Chinese patent application No. 2020111281479.7, filed on Nov. 1, 2021, all contents of which are incorporated herein by reference.

BACKGROUND

Technical Field

The present disclosure relates to the technical field of heat insulation, in particular to a heat insulation wall and a manufacturing method and mounting method thereof.

Description of the Related Art

At present, there are various heat insulation walls in the market, wherein traditional heat insulation materials are large in density, poor in heat insulation performance, thick when being laid, large in material loss, high in hygroscopicity, poor in anti-seismic performance and environment-friendly performance and incapable of reaching the energy-saving standard. In addition, some heat insulation materials can cause harm to the human body.

The heat insulation walls in the prior art peel off or fall off easily after being paved as wall insulation layers, do not have an ideal heat insulation and fireproof performance, and have safety hazard. The above problems greatly limit the application and development of the heat insulation walls.

BRIEF SUMMARY

The present disclosure has been accomplished in order to solve the above-mentioned problem, and aims to provide a heat insulation wall which effectively achieves the heat insulation effect, has the same service life as a building and meanwhile ensures the effects of decoration and attractiveness, a manufacturing method and mounting method thereof.

The present disclosure provides the summary part of the present disclosure to concisely introduce the concepts which will be described in detail in embodiment part below. The summary part of the present disclosure is not intended to identify key features or necessary features of the technical solution required to be protected, and is also not intended to limit the scope of the technical solution required to be protected.

In order to solve the above technical problem, an embodiment of the present disclosure provides a heat insulation wall, which is characterized by including:
at least one layer of panel, at least one layer of bottom plate and at least one layer of heat insulation board;
the panel and the bottom plate being connected through at least one partition body, and the heat insulation board being arranged between the panel and the bottom plate and maintained by the partition body;
wherein the partition body includes:
a partition body head, being connected with the panel; and
a partition body tail, being connected with the partition body head and the bottom plate in a partition manner.

In order to solve the above technical problem, an embodiment of the present disclosure provides a manufacturing method of the heat insulation wall, which is characterized by including:
connecting the partition body to the panel;
joining the at least one layer of heat insulation board with the partition body and performing maintaining by the partition body; and
joining the at least one layer of bottom plate with the partition body.

In order to solve the above technical problem, an embodiment of the present disclosure further provides a mounting method of the heat insulation wall, which is characterized by including:
joining a hook arranged on the bottom plate with an external rack in a suspending manner to splice a plurality of heat insulation walls; and
forming partition seams between the plurality of heat insulation walls, embedding sealing strips in the partition seams, and arranging a sealant on the sealing strip on one side of the panel.

In order to solve the above technical problem, an embodiment of the present disclosure further provides a mounting method of the heat insulation wall, which is characterized by including: pouring a wall body connecting structure that is joined with one side, which is not connected with the partition body tail, of a connecting bolt into a wall body; and
forming partition seams between the plurality of heat insulation walls, embedding sealing strips in the partition seams, and arranging a sealant on the sealing strip on one side of the panel.

Compared with the prior art, the technical solution disclosed by the present disclosure has the advantages that the structure is unique, the heat insulation and fireproof effects are effectively achieved, the heat insulation wall has the same service life as a building, and can effectively prevent wind and acid rain when being arranged on an outer wall of the building. In addition, the panel can be used as a decorative surface, and can ensure the effect of decoration and attractiveness no matter the panel is mounted on an inner wall or an outer wall.

In combination with the accompanying drawings and with reference to the following specific embodiments, the above and other features, advantages and aspects of the embodiments of the present disclosure will become more obvious. Throughout the accompanying drawings, the same or similar reference numerals represent the same or similar elements. It should be understood that the drawings are schematic, and components and elements are not necessarily drawn in proportion.

DETAILED DESCRIPTION

Unless otherwise defined, all the technical and scientific terms used herein have the same meaning as those generally understood by those skilled in the art to which the present disclosure belongs; the terms used in the description of the present application are only for the purpose of describing specific embodiments, and are not intended to limit the present disclosure; the terms "include" and "have" in the description and claims of the present disclosure and the above drawings and any deformations thereof are intended to cover non-exclusive inclusion. The terms "first," "second," or the like in the description and claims of the present disclosure or the above drawings are used to distinguish different objects, rather than describing a specific order.

Embodiments mentioned herein mean that specific features, structures, or characteristics described in conjunction with the embodiments may be included in at least one embodiment of the present disclosure. The phrase at each location in the description does not necessarily refer to the same embodiment, nor is it an independent or alternative embodiment that is mutually exclusive from other embodiments. It should be explicitly and implicitly understood by those skilled in the art that the embodiments described herein may be combined with other embodiments.

In order to enable those skilled in the art to better understand the solution disclosed by the present disclosure, the technical solutions in the embodiments of the present disclosure are clearly and completely described in combination with the accompanying drawings.

Besides, it should be noted that the upper, lower, left and right directions in the drawings are only examples of the specific embodiments, and those skilled in the art can change the directions of part or all of the components shown in the drawings according to actual requirements to apply the components without influencing the implementation of the various components or the whole system. The technical solutions for changing the direction still belong to the scope of protection of the present disclosure.

Heat Insulation Wall

According to one or more embodiments of the present disclosure, a heat insulation wall includes at least one layer of panel, at least one layer of bottom plate and at least one layer of heat insulation board; and in one or more embodiments, the panel and the bottom plate, for example, are arranged as one layer and are connected through a plurality of partition bodies, for example, and the heat insulation board is arranged between the panel and the bottom plate and is maintained by the partition bodies.

In one or more embodiments, an area of the panel is larger than that of the bottom plate, wherein the bottom plate is, for example, rectangular, the area of the bottom plate is 60 cm*90 cm or 20 cm*30 cm, the area of the panel is slightly larger than that of the bottom plate, for example, the area of the panel is 60.5 cm*90.5 cm or 20.5 cm*30.5 cm, and certainly, a side length of the panel can be 0.1-1 cm longer than that of the bottom plate according to needs, which is not limited.

In one or more embodiments, the material of the panel and/or the bottom plate includes, for example, at least any one of a metal plate, a ceramic plate, a slab stone, an adhesive mortar, a cement plate, a calcium silicate plate, a gypsum plate, a sound absorbing material, or a sound attenuation material, and in one or more embodiments, preferably, the panel adopts a smooth and flat surface finish material, such as a metal plate, a ceramic plate and a masonry surface, so as to realize various decorative treatments such as painting and wire drawing, and preferably, the material of the panel and/or bottom plate adopts metal plate.

In one or more embodiments, a thickness of the panel and/or the bottom plate can be, for example 3 mm-20 mm, preferably 10 mm, and certainly, the thickness can be adjusted according to the anti-corrosion requirement, the requirement for welding the partition body, and the requirements on the overall quality of the heat insulation wall, the using material, the cost and the like, which is not limited.

In one or more embodiments, one side surface of the bottom plate can be a smooth composite core material, and the other side surface of the bottom plate can be processed through texturing and wire drawing processes so that the bottom plate can be more easily laid on, for example, a wall after being smeared with bonding cement and the like. Certainly, the bottom plate may also adopts a high-strength gypsum plate, a light calcium silicate plate, or other materials, and preferably, is processed by texturing and wire drawing processes, so that the bonding strength and the flatness when the bottom plate is paved on, for example, the wall are enhanced.

In one or more embodiments, the panel and the bottom plate adopt aluminum alloy or stainless steel materials, an edge of the panel is bent towards the bottom plate so that a front projection area of the bent panel is consistent with the area of the bottom plate, that is, a portion, exceeding the side length of the bottom plate, of each side length of the panel is bent to be used for positioning the heat insulation board between the panel and the bottom plate. A groove used for bending is formed in, for example, the bending portion of the edge of the panel in advance so that deformation can be avoided during bending. In one or more embodiments, the bottom plate is further provided with a hook which is joined with an external rack in a suspending manner when being mounted, and is used by adopting a process of dry hanging construction clinging to a wall body.

In one or more embodiments, manners of connecting the panel and the bottom plate through the partition body include a physical manner and a chemical manner, and include at least any one of sewing, nailing, riveting, bolted joint, clamping, micro-hook fitting, bonding or welding, preferably, the manner of welding is adopted, for example, may be electric arc welding, argon arc welding, $CO_2$ shielded welding, oxygen-acetylene welding, laser welding, electroslag pressure welding or other various manners of fusion welding, pressure welding and brazing.

Figure 1:
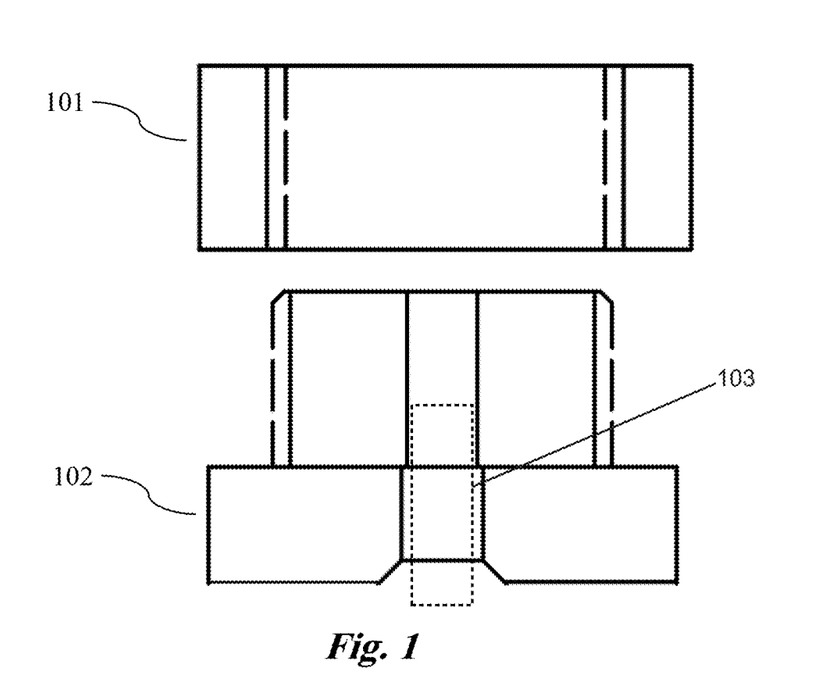
FIG. 1 is a section view of an embodiment of a heat insulation wall of the present disclosure.

As shown in FIG. 1, FIG. 1 is a section view of an embodiment of a heat insulation wall of the present disclosure. The partition body includes:

a partition body head 101, being connected with the panel; and a partition body tail 102, being connected with the partition body head 101 and the bottom plate in a partition manner so as to isolate a connection between the panel and the bottom plate.

In one or more embodiments, a contact area between the partition body head 101 and the panel is, for example, not more than 1% of a total area of the panel in proportion.

In one or more embodiments, the whole partition body is, for example, a cylinder with a diameter of 1-10 cm, the partition body can be arranged according to an interval of 10 cm-80 cm, preferably an interval of 25 cm-60 cm, for example, the partition body with the diameter of 3 cm may be arranged according to an interval of 15 cm in transverse and vertical directions. Partition bodies with different diameters, heights, densities or the like are set according to specific conditions, so that not only can the supporting and isolating effects be achieved, also the flatness of the panel can be guaranteed, in addition, the overall mass of the heat insulation wall can be reduced, used materials are reduced, and the cost is saved.

In one or more embodiments, the partition body head 101 adopts metal materials such as aluminum alloy or stainless steel materials, and the partition body tail 102 adopts polytetrafluoroethylene (PTFE) materials which are resistant to acid and alkali, corrosion and high temperature; and due to the unique molecular structure of PTFE (PTFE molecules are carbon chains surrounded by F atoms, and short C—F bond length has large bond energy), acid and alkali cannot destroy the molecular structure of PTFE. PTFE is extremely high in acid resistance and alkali resistance, and thus can be used under most exhaust gas working conditions. When being used under the temperature condition of 230~320° C., due to the disorientation effect on PTFE by high temperature, the strength and breaking elongation decrease and increase respectively with the increase of heat treatment temperature; and long-term use in the temperature range of 230° C. can be achieved, even dust removal for exhaust gas of a garbage incinerator and a coal-fired boiler can be achieved, the heat insulation and fireproof effect of the heat insulation wall can be sufficiently ensured, the same service life as the building can be achieved, and when PTFE is arranged on the outer wall of the building, wind and acid rain can be effectively prevented.

In one or more embodiments, the partition body head 101 is of, for example, a nut structure, and the partition body tail 102 is of, for example, a hollow bolt structure; and the partition body head 101 is fixedly connected with the panel.

In one or more embodiments, the partition body head 101 is in welded connection with the panel, for example, welding power can be reduced to be not smaller than 200 W through laser welding after instant high temperature, and of course, the welding power can be adjusted to be 1000 W-2000 W, preferably 1500 W according to needs. It is shown through actual experiments that when the welding power is reduced to be 1500 W after instant high temperature, an outer surface side (namely, the other side of one side opposite to the bottom plate) of the panel cannot have the phenomena of blackening, deformation or the like when the partition body is welded, so that the welding strength and the attractiveness are ensured; and the partition body head 101 is welded to the panel in a corner alignment welding manner so as to prevent the panel from deformation, that is, according to the required layout, two partition bodies at diagonal positions are welded firstly, then partition bodies at the other diagonal positions are welded, and so on, and the actual experiments show that the influence on the shape of the panel can be greatly reduced.

In one or more embodiments, the partition body tail 102 is connected with the bottom plate through a connecting bolt; and the connecting bolt penetrates through the bottom plate and is screwed into a hollow portion of the partition body tail 102. In one or more embodiments, the bottom plate is pre-perforated according to the position of the partition body for connecting bolt to pass through.

In one or more embodiments, a length of a bolt rod, screwed into the partition body head 101, of the partition body tail 102 is not greater than a length of the partition body head 101 (namely a height of the partition body head 101 in a vertical direction); a length of a bolt rod, screwed into the partition body tail 102, of the connecting bolt is not greater than a length of the partition body tail 102 (namely a height of the partition body tail 102 in the vertical direction), so that the connection between the panel and the bottom plate is isolated.

In one or more embodiments, the connecting bolt is an expansion bolt, a split bolt or other bolts of different specifications, an inner diameter of the hollow portion of the partition body tail 102 is gradually reduced from the side of the bottom plate to the side of the panel, and when the expansion bolt, the split bolt or the like are screwed in, tight joint of the connecting bolt and the partition body tail 102 can be achieved, so that tight joint of the bottom plate and the panel is realized.

In one or more embodiments, the side, which is not connected with the partition body tail 102, of the connecting bolt is joined with a building wall body connecting structure, and the connecting structure is, for example, a metal disc or other objects and is used for increasing a stress area with a building wall body so as to achieve stable joint of the heat insulation wall and the building wall body.

In one or more embodiments, the cross sectional area, height (length), quantity, size and layout of the partition body are not specially limited, and can be selected according to the required support effect or the like. Although the partition body shown in the FIG. 1 is cylindrical, the shape of the partition body is not limited to this, and the partition body can also be in other shapes such as a cuboid, a cube, an ellipsoid and other polygon.

Furthermore, although a plurality of partition bodies may be arranged in a matrix pattern at equal intervals, the plurality of partition bodies may also be arranged according to other intervals, layouts, and patterns, such as a concentric annular pattern and irregular distribution patterns. Moreover, the plurality of partition bodies are not limited to be arranged at equal intervals.

In addition, the cross sectional area, height (length), quantity, size and layout patterns of the partition body can be selected according to the required support effect, cost, weight and other factors. Specifically, if a better support effect is needed, the cross sectional area of the partition body can be set to be larger in size and/or the partition body is set to be greater in quantity; and on the contrary, the cross sectional area of the partition body can be set to be smaller and/or the partition body can be set to be smaller in quantity.

Figure 2:
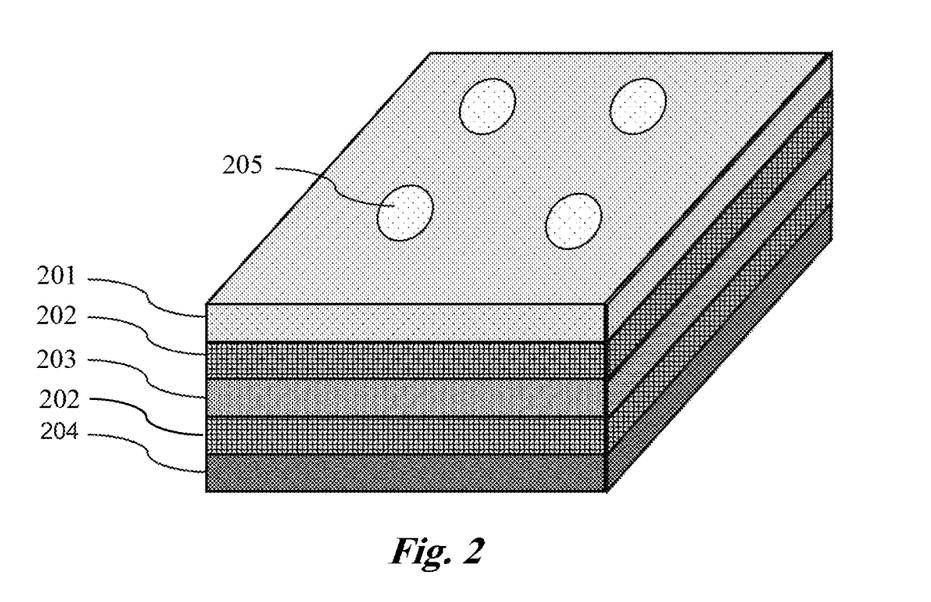
FIG. 2 is a stereogram of an embodiment of a heat insulation board of a heat insulation wall of the present disclosure.

FIG. 2 is a stereogram of an embodiment of a heat insulation board of a heat insulation wall of the present disclosure.

The heat insulation board is provided with an inner-side outer surface layer 201, a medium layer 202, a heat insulation layer 203, a medium layer 202, an outer-side outer surface layer 204 and holes 205 from top to bottom. Of course, the heat insulation board can be only provided with the inner-side outer surface layer 201 or the outer-side outer surface layer 204 and can also be only provided with one medium layer 202, the quantity of the layers is not limited, for example, two or more heat insulation layers 203 can be arranged according to the actual conditions. A thickness of each layer of the heat insulation board is not limited, for example, the thickness of each layer can be 1 cm, and certainly, the thickness of each layer can also be 2 cm or more, and different thicknesses can be set according to the actual conditions and are not limited. However, in consideration of the use as the hat insulation layer for a wall surface, it is preferable that two layers of aerogel felts of the heat insulation layer are respectively 1 cm thick.

In one or more embodiments, the heat insulation board includes holes 205 corresponding to the partition bodies in the cross sectional area, quantity, position, outer contour, shape, layout pattern and the like; a front projection area of the hole 205 is slightly smaller than a front projection area of the partition body so as to realize tight joint of the heat insulation board and the partition body, and the front projection area refers to an orthographic projection area of the heat insulation board on the panel; the arrangement of a distance between the holes is roughly consistent with the arrangement of the partition body, for example, the distance is 10~80 cm, the thickness of the heat insulation board is, for example 30~80 mm, the fireproof grade is, for example, A1, and the heat conductivity coefficient is, for example, 0.010~0.050.

In one or more embodiments, the heat insulation layer 3, for example, includes an aerogel felt and can also include, for example, aerogel cloth, aerogel paper, an aerogel plate, a fiber reinforced aerogel felt, other special-shaped aerogel pieces, or other aerogel products, which is not limited.

In one or more embodiments, aerogel may be, for example, any one of silicon dioxide aerogel, carbon aerogel, aluminum oxide aerogel, zirconium oxide aerogel, titanium oxide aerogel, iron oxide aerogel, cobalt oxide aerogel, nickel oxide aerogel, copper oxide aerogel, yttrium oxide aerogel, cerium oxide aerogel, vanadium oxide aerogel, bismuth oxide aerogel, tin oxide aerogel, benzenediol formaldehyde aerogel, or graphene aerogel.

In one or more embodiments, fiber in the fiber reinforced aerogel felt may be any one of glass fiber, carbon fiber, quartz fiber, high silica fiber, aluminum silicate fiber, mullite fiber, silicon carbide fiber, silicon nitride fiber, aluminum oxide fiber, boron nitride fiber, basalt fiber, brucite fiber, attapulgite fiber, boron fiber, carbon nanotubes, aramid fiber, polyimide fiber, or ultra-high molecular weight polyethylene fiber.

In one or more embodiments, the medium layer 202 may include, for example, at least any one of a polyester fiber metal coated fabric, a non-woven fabric, a glass fiber felt, or a glass fiber mesh.

Certainly, the material of the medium layer 202 of the heat insulation board may also include but is not limited to hard paper, soft paper, non-woven fabric, offset paper, coated paper, cast coated paper, laser sprayed paper, kraft paper, fluorescent paper, gold-plated paper, aluminum-foil paper, fragile (anti-counterfeiting) paper, silver-plated paper, masking paper, label (Tyvek/nylon) paper, nacreous paper, sandwich coated paper, variable information paper and low-density polyethylene, linear low-density polyethylene, high-density polyethylene, biaxially oriented polypropylene, casting polypropylene, polyphenylene sulfide, polystyrene, polyester, polyamide, polyvinylidene chloride, polycarbonate, polyvinyl alcohol, polylactic acid, aluminum foil, rubber for contact, transparent polyester (PET), semi-transparent polyester (PET), transparent oriented polypropylene (OPP), semi-transparent oriented polypropylene (OPP), light white polyvinyl chloride (PVC), non-light-white polyvinyl chloride (PVC), matt white polyvinyl chloride (PVC), synthetic paper, glazed gold (silver) polyester, matt gold (silver) polyester or the like, which can be easily joined with an outer surface layer in a chemical manner.

In one or more embodiments, the inner-side outer surface layer 202 and/or the outer-side outer surface layer 204 may include, for example, at least any one of a metal plate, a ceramic plate, a slab stone, an adhesive mortar, a cement plate, a calcium silicate plate, a gypsum plate, a sound absorbing material, or a sound attenuation material.

Furthermore, FIG. 2 shows that a through hole is formed by partially removing the material of the inner-side outer surface layer 201 and/or the outer-side outer surface layer 204 in order to form the holes 205.

In one or more embodiments, the inner-side outer surface layer 201 and/or the outer-side outer surface layer 204 may be, for example, provided with through holes and/or slots, and are joined with other layers into a whole by utilizing the through holes and/or slots in a physical manner, for example, in a sewing or nailing manner. Therefore, the needle and thread movement can be easily controlled during sewing and/or nailing, so that product modes are neat and attractive, threads and/or nails for sewing and/or nailing cannot protrude out of the surface, and the threads and/or nails are protected from being damaged during use.

In one or more embodiments, the row and/or column spacing of the thread slots is, for example, 30 mm~60 mm and the distance of the through holes is, for example, 10 mm~15 mm, preferably the row and/or column spacing of the thread slots is 50 mm and the distance of the through holes is 15 mm.

In one or more embodiments, the heat insulation layer 203 and the medium layer 202 are joined into a whole in a physical manner; and of course, other layers, for example, the heat insulation layer 203 and the inner-side outer surface layer 201 and/or the outer-side outer surface layer 204 may also be joined in a physical manner, which is not limited.

In one or more embodiments, the physical manner may include, for example, at least any one of sewing, nailing, riveting, bolted joint, clamping, or micro-hook fitting (e.g., a primary-and-secondary adhesive tape-like manner).

In one or more embodiments, when a physical manner of sewing is adopted, for example, PTFE sewing threads (polytetrafluoroethylene sewing threads) with acid and alkali resistance, corrosion resistance and high temperature resistance are adopted for sewing. When a physical manner of nailing is adopted, for example, rod-shaped buckle type metal aluminum alloy or high-strength carbon steel hardware is adopted for nailing.

After acid and alkali treatment, the strength of the PTFE sewing threads can be kept to be about 80% for a long time. Certainly, when the physical manner of sewing or nailing is adopted, acid-resistant and alkali-resistant, corrosion-resistant, and high-temperature resistant polymer nylon threads or other material threads, for example, also can be used as sewing threads or nailing threads for sewing or nailing, which is not limited.

In one or more embodiments, the row spacing and/or column spacing of the sewing or nailing threads is, for example, 30 mm~60 mm, a stitch distance is, for example, 10 mm~15 mm, preferably, the row spacing and/or column spacing is 50 mm, and the stitch distance is 15 mm.

In one or more embodiments, the medium layer 202 can, for example, cover or completely wrap the heat insulation layer 203, so that when the material of the heat insulation layer 203 enters production equipment, for example, quilting thread sewing equipment for sewing, workshop environment pollution and harm to the human lung caused by powder falling and glass fiber dust flying due to vibration of the equipment are prevented.

In one or more embodiments, the inner-side outer surface layer 201 and/or the outer-side outer surface layer 204 is joined with the medium layer 202 into a whole in a chemical manner. The chemical manner may, for example, include bonding manners using at least any one of an adhesive, a double-faced adhesive tape, a plant adhesive, a polyurethane composite adhesive, an epoxy resin, a curing agent, an accelerant, a water-based elastic coating, a water-based resin, a water-based environment-friendly composite adhesive, a flame retardant or a dispersing agent.

In one or more embodiments, the layers of the heat insulation wall can be bonded through an adhesive, the material of the adhesive can include but is not limited to a universal super-sticky type material, a universal strong-sticky type material, a refrigerated food strong-sticky type material, a universal re-uncovering type material, a fiber re-uncovering type material or the like, and preferably a material with a low heat conductivity coefficient.

The heat insulation board of the present disclosure preferably has a total thickness of 25~80 mm, in consideration of the use as a heat insulation layer for a wall surface, it is more preferable that two layers of aerogel felts are 10 mm thick, and the overall thickness is about 30 mm, thereby not only ensuring the effect of heat insulation, also enabling not too much space occupation, and achieving better stiffness and tensile property through physical joint. The heat insulation board preferably adopts a material with a high fireproof grade, an overall fireproof grade is A1, a heat conductivity coefficient is 0.01~0.05, and preferably, the overall heat conductivity coefficient is about 0.020. The overall heat insulation board can, for example, be in various shapes such as a rectangular plate shape, a square plate shape, a circular plate shape and a hexagonal plate shape.

In addition, although FIG. 2 shows a sandwich structure formed by the inner-side outer surface layer 201, the medium layer 202, the heat insulation layer 203, the medium layer 202 and the outer-side outer surface layer 204, which is not limited, and the heat insulation board can also be of a multi-layer sandwich structure, for example, the quantity of each layer is two or more.

The respective layers can be joined by adopting a physical manner which may, for example, include at least any one of sewing, nailing, riveting, bolted joint, engaging and microhook fitting, and also by adopting a chemical manner which may, for example, include bonding manners using at least any one of an adhesive, a double-faced adhesive tape, a plant adhesive, a polyurethane composite adhesive, an epoxy resin, a curing agent, an accelerant, a water-based elastic coating, a water-based resin, a water-based environment-friendly composite adhesive, a flame retardant or a dispersing agent.

Manufacturing Method

Figure 3:
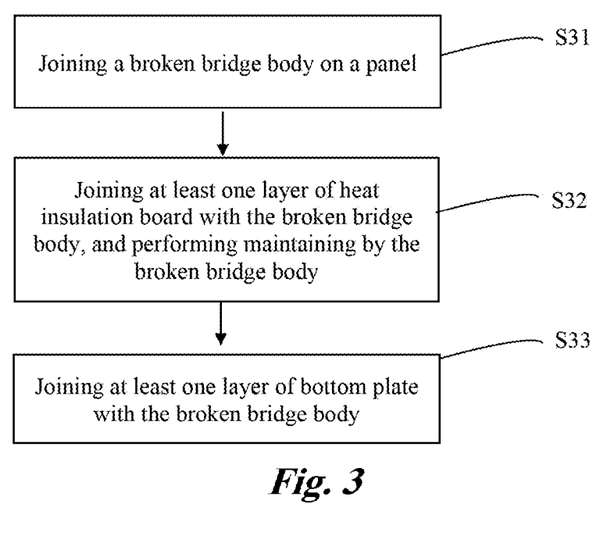
FIG. 3 is a flow chart of an embodiment of a manufacturing method of the present disclosure.

According to one or more embodiments of the present disclosure, the present disclosure provides a manufacturing method of the heat insulation wall, as shown in FIG. 3, the manufacturing method in the embodiment includes the following steps.

S31, the partition body is joined to the panel.

In one or more embodiments, the partition body head 101 is in welded connection with the panel, for example, welding power can be reduced to be not smaller than 200 W through laser welding after instant high temperature, and of course, the welding power can be adjusted to be 1000 W-2000 W, preferably 1500 W according to needs. It is shown through actual experiments that when the welding power is reduced to be 1500 W after instant high temperature, an outer surface side (namely, the other side of one side opposite to the bottom plate) of the panel cannot have the phenomena of blackening, deformation or the like when the partition body is welded, so that the welding strength and the attractiveness are ensured; and the partition body head 101 is welded to the panel in a corner alignment welding manner so as to prevent the panel from deformation, that is, according to the required layout, two partition bodies at diagonal positions are welded firstly, then partition bodies at the other diagonal positions are welded, and so on, and the actual experiments show that the influence on the shape of the panel can be greatly reduced.

In one or more embodiments, the quantity, position and layout of the partition body on the panel in unit area are determined according to preset requirements.

In one or more embodiments, the whole partition body is, for example, a cylinder with a diameter of 1-10 cm, the partition body can be arranged according to an interval of 10 cm-80 cm, preferably an interval of 25 cm-60 cm, for example, the partition body with the diameter of 3 cm may be arranged according to an interval of 15 cm in transverse and vertical directions. Partition bodies with different diameters, heights, densities or the like are set according to specific conditions, so that not only can the supporting and isolating effects be achieved, also the flatness of the panel can be guaranteed, in addition, the overall mass of the heat insulation wall can be reduced, used materials are reduced, and the cost is saved. The cross sectional area, height (length), quantity, size and layout of the partition bodies are not specially limited, the partition bodies can be arranged in a matrix pattern at equal intervals, which is not limited to this, and the partition bodies may also be arranged according to other intervals, layouts, and patterns, such as a concentric annular pattern and irregular distribution patterns. Moreover, a plurality of partition bodies are not limited to be arranged at equal intervals.

In one or more embodiments, the partition bodies are joined to the at least one layer of panel, for example, according to the determined quantity, position, and layout of the partition bodies.

The manufacturing method of the heat insulation wall further includes that building positioning is performed through an intelligent system, climate conditions of a positioned area, such as temperature, humidity, wind speed, rainfall pH value, building bearing capacity or other data, are intelligently analyzed, a matching library is recognized, big data analysis is performed, and according to the preset service life of each heat insulation wall, the material and thickness of the panel or the bottom plate and the quantity, layout and the like of the partition bodies are determined, and a design drawing is generated according to analyzed data, so that the required cost is saved to the greatest extent on the basis of meeting the requirements.

S32, at least one layer of heat insulation board is joined with the partition body, and is maintained by the partition body.

In one or more embodiments, the method further includes that the at least one layer of heat insulation board is provided with holes 205 according to the quantity, position, layout and shape of the partition body.

S33, at least one layer of bottom plate is joined with the partition body.

In one or more embodiments, the partition body head is welded on the at least one layer of panel; the partition body tail is screwed to the partition body head; and the connecting bolt penetrates through the bottom plate and is screwed to the partition body tail.

In one or more embodiments, the partition body tail 102 is connected with the bottom plate through a connecting bolt 103; and the connecting bolt 103 penetrates through the bottom plate and is screwed into a hollow portion of the partition body tail 102. In one or more embodiments, the bottom plate is pre-perforated according to the positions of the partition bodies for connecting bolts to pass through.

In one or more embodiments, a length of a bolt rod, screwed into the partition body head 101, of the partition body tail 102 is not greater than a length of the partition body head 101 (namely a height of the partition body head 101 in a vertical direction); a length of a bolt rod, screwed into the partition body tail 102, of the connecting bolt is not greater than a length of the partition body tail 102 (namely a height of the partition body tail 102 in the vertical direction), so that the connection between the panel and the bottom plate is isolated.

In one or more embodiments, the connecting bolt is an expansion bolt, a split bolt or other bolts of different specifications, an inner diameter of the hollow portion of the partition body tail 102 is gradually reduced from the side of the bottom plate to the side of the panel, and when the expansion bolt, the split bolt or the like are screwed in, tight joint of the connecting bolt and the partition body tail 102 can be achieved, so that tight joint of the bottom plate and the panel is realized.

In one or more embodiments, the method further includes that the partition body tail 102 is screwed into the partition body head 101.

In one or more embodiments, the manufacturing method can further include steps of manufacturing the heat insulation board:

- flatly laying an aerogel felt of the heat insulation layer 203;
- paving a glass fiber felt of the medium layer 202 to form a bag-shaped aerogel felt completely wrapping the heat insulation layer 203; and
- (3) putting the aerogel felt of the heat insulation layer 203 wrapped by the glass fiber felt of the medium layer 202 into quilting thread sewing equipment for sewing by using, for example, PTFE (polytetrafluoroethylene) sewing threads with acid and alkali resistance, corrosion resistance and high temperature resistance;
- brushing, for example, an adhesive, on an upper surface and a lower surface of the sewed medium layer 202; and
- respectively bonding smooth composite core material sides of the inner-side outer surface layer 201 and the outer-side outer surface layer 204 to the upper surface and the lower surface of the medium layer 202.

In one or more embodiments, a hot press molding process may also be performed at, for example, 100° C. and a pressure of 5 Mpa.

Mounting Method

According to one or more embodiments of the present disclosure, the present disclosure provides a mounting method of the heat insulation wall. The mounting method in the embodiment includes:

- joining a hook arranged on the bottom plate with an external rack in a suspending manner to splice a plurality of units of heat insulation walls; and
- forming partition seams between the plurality of heat insulation walls, embedding sealing strips in the partition seams, and arranging a sealant on the sealing strip on one side of the panel.

In one or more embodiments, the mounting method includes: pouring a wall body connecting structure that is joined with one side, which is not connected with the partition body tail, of the connecting bolt into a wall body; pouring a metal plate of the connecting structure poured into the building wall body to increase a stress area with the building wall body, thereby achieving stable joint of the heat insulation wall and the building wall body; and

- forming partition seams between the plurality of heat insulation walls, embedding sealing strips in the partition seams, and arranging a sealant on the sealing strip on one side of the panel.

It should be understood that although all the steps in the flow chart of the drawing are displayed in sequence according to the indication of an arrow, the steps are not necessarily performed in sequence according to the indication of the arrow. Unless expressly stated herein, these steps are executed without a strict sequence limitation, and may be executed in other sequences. Moreover, at least a part of steps in the flow chart of the drawing may include a plurality of sub-steps or a plurality of stages, these sub-steps or stages are not necessarily executed to be completed at the same moment, but can be executed at different moments, and the execution sequence is not necessarily performed in sequence, but the sub-steps or stages can be performed in turn or alternately with other steps or at least a part of sub-steps or stages of other steps.

According to one or more embodiments of the present disclosure, a heat insulation wall is provided, which is characterized by including:

- at least one layer of panel, at least one layer of bottom plate and at least one layer of heat insulation board;
- the panel and the bottom plate being connected through at least one partition body, and the heat insulation board being arranged between the panel and the bottom plate and maintained by the partition body;
- wherein the partition body includes:
  - a partition body head, being connected with the panel; and
  - a partition body tail, being connected with the partition body head and the bottom plate in a partition manner.

According to one or more embodiments of the present disclosure, a heat insulation wall is provided, which is characterized in that an area of the panel is greater than that of the bottom plate;

- a material of the panel and/or the bottom plate comprises at least any one of
- a metal plate, a ceramic plate, a slab stone, an adhesive mortar, a cement plate, a calcium silicate plate, a gypsum plate, a sound absorbing material, or a sound attenuation material.

According to one or more embodiments of the present disclosure, a heat insulation wall is provided, which is characterized in that

- the panel and the bottom plate adopt an aluminum alloy material, the partition body head adopts a metal material, and the partition body tail adopts a polytetrafluoroethylene material;
- an edge of the panel is bent towards the bottom plate so that a front projection area of the bent panel is consistent with an area of the bottom plate; and
- a groove used for bending is formed in the bending portion of the edge of the panel in advance.

According to one or more embodiments of the present disclosure, a heat insulation wall is provided, which is characterized in that

- manners of connecting the panel and the bottom plate through the partition body include a physical manner and a chemical manner, and the physical manner includes at least any one of sewing, nailing, riveting, bolted joint, clamping, micro-hook fitting, bonding or welding.

According to one or more embodiments of the present disclosure, a heat insulation wall is provided, which is characterized in that

- the partition body head is of a nut structure, and the partition body tail is of a hollow bolt structure;
- the partition body head is fixedly connected with the panel, and the partition body tail is connected with the bottom plate through a connecting bolt; and
- the connecting bolt penetrates through the bottom plate and is screwed into a hollow portion of the partition body tail.

According to one or more embodiments of the present disclosure, a heat insulation wall is provided, which is characterized in that a length of a bolt rod, screwed into the partition body head, of the partition body tail is not greater than a length of the partition body head, and a length of a bolt rod, screwed into the partition body tail, of the connecting bolt is not greater than a length of the partition body tail.

According to one or more embodiments of the present disclosure, a heat insulation wall is provided, which is characterized in that the connecting bolt is an expansion bolt; and
an inner diameter of the hollow portion of the partition body tail is gradually reduced from a side of the bottom plate to a side of the panel.

According to one or more embodiments of the present disclosure, a heat insulation wall is provided, which is characterized in that the heat insulation board includes holes corresponding to the partition bodies in quantity, position and outer contour.

A front projection area of the hole is smaller than that of the partition body; and a distance between the holes is 10~80 cm, and the heat insulation board has a thickness of 30~80 mm, a fireproof grade being A1, and a heat conductivity coefficient being 0.010~0.050.

According to one or more embodiments of the present disclosure, a heat insulation wall is provided, which is characterized in that a total projection area of the at least one partition body is not more than 1% of a total area of the panel in proportion.

According to one or more embodiments of the present disclosure, a heat insulation wall is provided, which is characterized in that the base plate is provided with a hook to be joined with an outside in a suspending manner.

According to one or more embodiments of the present disclosure, a heat insulation wall is provided, which is characterized in that a wall body connecting structure is arranged on one side, which is not connected with the partition body tail, of the connecting bolt.

According to one or more embodiments of the present disclosure, a manufacturing method of the heat insulation composite board as described above is provided, and is characterized by including:

connecting the partition body to the panel;
joining the at least one layer of heat insulation board with the partition body and performing maintaining by the partition body; and
joining the at least one layer of bottom plate with the partition body.

According to one or more embodiments of the present disclosure, a manufacturing method of the heat insulation composite board as described above is provided, and is characterized by further including:

welding the partition body head on the at least one layer of panel;
screwing the partition body to the partition body head; and
enabling the connecting bolt to penetrate through the bottom plate and screwing the connecting bolt to the partition body tail.

According to one or more embodiments of the present disclosure, a manufacturing method of the heat insulation composite board as described above is provided, and is characterized by performing laser welding on the partition body head and the panel, and lowering welding power to be not smaller than 200 W after instant high temperature; and
welding the partition body head to the panel in a corner alignment welding manner.

According to one or more embodiments of the present disclosure, the present disclosure provides a mounting method of the thermal insulation wall as described above, which is characterized by joining a hook arranged on the bottom plate with an external rack in a suspending manner to splice a plurality of heat insulation walls; and
forming partition seams between the plurality of heat insulation walls, embedding sealing strips in the partition seams, and arranging a sealant on the sealing strip on one side of the panel.

According to one or more embodiments of the present disclosure, the present disclosure provides a mounting method of the thermal insulation wall as described above, which is characterized by pouring a wall body connecting structure that is joined with one side, which is not connected with the partition body tail, of the connecting bolt into a wall body; and
forming partition seams between the plurality of heat insulation walls, embedding sealing strips in the partition seams, and arranging a sealant on the sealing strip on one side of the panel.

The above description is only the preferred embodiments of the present disclosure and an illustration of the applied technical principle. Those skilled in the art should understand that the scope involved in the present disclosure is not limited to the technical solutions formed by specific combination of the above technical features, and also should cover other technical solutions formed by arbitrary combination of the above technical features or equivalent features thereof without departing from the concept of the present disclosure, for example, the technical solution formed by replacing the above features with (but not limited to) technical features with similar functions disclosed in the present disclosure.

Further, although various operations are described in a specific sequence, it should not be understood as that these operations are required to be performed in the specific sequence order shown or in a sequential order. Likewise, although several specific implementation details are included in the above description, these should not be interpreted as limitations on the scope of the present disclosure. Certain features described in the context of the independent embodiments may also be implemented in combination in a single embodiment. On the contrary, various features described in the context of the single embodiment may also be implemented in multiple embodiments either alone or in any suitable sub-combination.

Although the subject matter has been described in a language specific to structural features and/or method actions, it should be understood that the subject matter defined in appended claims is not necessarily limited to the specific features or actions described above. On the contrary, the specific features and actions described above are only example forms of implementing the claims.

What is claimed is:

1. A heat insulation wall, comprising:
at least one layer of panel, at least one layer of bottom plate and at least one layer of heat insulation board;
the panel and the bottom plate being connected through at least one partition body, and the heat insulation board being arranged between the panel and the bottom plate and maintained by the partition body;

wherein the partition body comprises:
a partition body head, being connected with the panel; and
a partition body tail, being connected with the partition body head and the bottom plate;
wherein the partition body head is of a nut structure, and the partition body tail is of a hollow bolt structure;
wherein the partition body head is fixedly connected with the panel, and the partition body tail is connected with the bottom plate through a connecting bolt; and
wherein the connecting bolt penetrates through the bottom plate and is screwed into a hollow portion of the partition body tail.

2. The heat insulation wall according to claim 1, wherein an area of the panel is greater than that of the bottom plate; a material of the panel and/or the bottom plate comprises at least any one of a metal plate, a ceramic plate, a slab stone, an adhesive mortar, a cement plate, a calcium silicate plate, a gypsum plate, a sound absorbing material, or a sound attenuation material.

3. The heat insulation wall according to claim 2, wherein the panel and the bottom plate adopt an aluminum alloy material, the partition body head adopts a metal material, and the partition body tail adopts a polytetrafluoroethylene material;
an edge of the panel is bent towards the bottom plate so that a front area of the bent panel is consistent with an area of the bottom plate; and
a groove used for bending is formed in the bending portion of the edge of the panel in advance.

4. The heat insulation wall according to claim 1, wherein manners of connecting the panel and the bottom plate through the partition body comprise a physical manner and a chemical manner, and comprise at least any one of sewing, nailing, riveting, bolted joint, clamping, micro-hook fitting, bonding or welding.

5. The heat insulation wall according to claim 1, wherein a length of a bolt rod, which is screwed into the partition body head, of the partition body tail is not greater than a length of the partition body head, and a length of a bolt rod, which is screwed into the partition body tail, of the connecting bolt is not greater than a length of the partition body tail.

6. The heat insulation wall according to claim 1, wherein the connecting bolt is an expansion bolt; and
an inner diameter of the hollow portion of the partition body tail is gradually reduced from a side of the bottom plate to a side of the panel.

7. The heat insulation wall according to claim 1, wherein the heat insulation board comprises holes corresponding to the partition body in quantity, position and outer contour;
a front area of the hole is smaller than that of the partition body; and
a distance between the holes is 10~80 cm, and the heat insulation board has a thickness of 30~80 mm, a fireproof grade being A1, and a heat conductivity coefficient being 0.010~0.050.

8. The heat insulation wall according to claim 1, wherein a total area of the at least one partition body is not more than 1% of a total area of the panel in proportion.

9. The heat insulation wall according to claim 1, wherein a wall body connecting structure is arranged on one side, which is not connected with the partition body tail, of the connecting bolt.

10. A manufacturing method of the heat insulation wall according to claim 1, comprising:
joining the partition body to the panel;
joining the at least one layer of heat insulation board with the partition body and performing maintaining by the partition body; and
joining the at least one layer of bottom plate with the partition body.

11. The manufacturing method of the heat insulation wall according to claim 10, further comprising:
welding the partition body head on the at least one layer of panel;
screwing the partition body to the partition body head; and
enabling the connecting bolt to penetrate through the bottom plate and screwing the connecting bolt to the partition body tail.

12. The manufacturing method of the heat insulation wall according to claim 10, wherein
performing laser welding on the partition body head and the panel, and lowering welding power to be not smaller than 200 W after instant high temperature; and
the partition body head is welded to the panel in a corner alignment welding manner.

13. A mounting method of the heat insulation wall according to claim 1,
joining a hook arranged on the bottom plate with an external rack in a suspending manner to splice a plurality of heat insulation walls; and
forming partition seams between the plurality of heat insulation walls, embedding sealing strips in the partition seams, and arranging a sealant on the sealing strip on one side of the panel.

14. The mounting method of the heat insulation wall according to claim 1, wherein
pouring a wall body connecting structure that is joined with one side, which is not connected with the partition body tail, of the connecting bolt into a wall body; and
forming partition seams between the plurality of heat insulation walls, embedding sealing strips in the partition seams, and arranging a sealant on the sealing strip on one side of the panel.

15. A heat insulation wall, comprising:
at least one layer of panel, at least one layer of bottom plate and at least one layer of heat insulation board;
the panel and the bottom plate being connected through at least one partition body, and the heat insulation board being arranged between the panel and the bottom plate and maintained by the partition body;
wherein the partition body comprises:
a partition body head, being connected with the panel; and a partition body tail, being connected with the partition body head and the bottom plate in a partition manner;
wherein the panel and the bottom plate adopt an aluminum alloy material, the partition body head adopts a metal material, and the partition body tail adopts a polytetrafluoroethylene material;
wherein an edge of the panel is bent towards the bottom plate so that a front area of the bent panel is consistent with an area of the bottom plate; and
wherein a groove used for bending is formed in the bending portion of the edge of the panel in advance.

16. The heat insulation wall according to claim 15, wherein
an area of the panel is greater than that of the bottom plate;

a material of the panel and/or the bottom plate comprises at least any one of a metal plate, a ceramic plate, a slab stone, an adhesive mortar, a cement plate, a calcium silicate plate, a gypsum plate, a sound absorbing material, or a sound attenuation material.

17. The heat insulation wall according to claim 15, wherein the heat insulation board comprises holes corresponding to the partition body in quantity, position and outer contour;

a front area of the hole is smaller than that of the partition body; and a distance between the holes is 10~80 cm, and the heat insulation board has a thickness of 30~80 mm, a fireproof grade being A1, and a heat conductivity coefficient being 0.010~0.050.

18. The heat insulation wall according to claim 15, wherein a total area of the at least one partition body is not more than 1% of a total area of the panel in proportion.

* * * * *